United States Patent [19]

Sugita et al.

[11] Patent Number: 5,251,434
[45] Date of Patent: Oct. 12, 1993

[54] PRESSURIZED FLUIDIZED-BED BOILER POWER PLANT

[75] Inventors: Shigehisa Sugita; Yoshiki Noguchi; Kazuo Ikeuchi, all of Hitachi; Taro Sakata, Hiroshima; Shigeyoshi Kawano, Kure, all of Japan

[73] Assignees: Hitachi, Ltd.; Babcock-Hitachi Kabushiki Kaisha, both of Tokyo, Japan

[21] Appl. No.: 799,963

[22] Filed: Nov. 29, 1991

[30] Foreign Application Priority Data

Nov. 30, 1990 [JP] Japan .................. 2-328932

[51] Int. Cl.⁵ .................. F02C 3/26; F02C 6/18
[52] U.S. Cl. .................. 60/39.182; 60/39.464; 60/728
[58] Field of Search .................. 60/39.182, 39.464, 728, 60/39.02, 39.12

[56] References Cited

U.S. PATENT DOCUMENTS

| 3,335,565 | 8/1967 | Aguet ........................... 60/39.182 |
| 4,028,883 | 6/1977 | Meyer-Kahrweg ........... 60/39.182 |
| 4,852,345 | 8/1989 | Greis . |
| 4,852,346 | 8/1989 | Granqvist et al. ............ 60/39.464 |
| 4,896,497 | 1/1990 | Pillai . |

FOREIGN PATENT DOCUMENTS

| 0361065 | 4/1990 | European Pat. Off. . |
| 3806016 | 8/1988 | Fed. Rep. of Germany . |
| 2277875 | 6/1976 | France . |
| 8903471 | 4/1989 | PCT Int'l Appl. . |
| 9008887 | 9/1990 | PCT Int'l Appl. . |

OTHER PUBLICATIONS

263 Energiespektrum 1987, Jan. No. 1, Mindelheim, W. Germany "Marschbefehl fur Dawid".

Primary Examiner—Louis J. Casaregola
Attorney, Agent, or Firm—Antonelli, Terry, Stout & Kraus

[57] ABSTRACT

A pressurized fluidized-bed boiler power plant comprises: a pressurized fluidized-bed boiler including a fluidized-bed boiler and a pressure vessel containing the fluidized bed; a single-shaft gas turbine including a gas turbine, an air compressor and an electric generator; and a steam turbine unit in which steam generated by the pressurized fluidized-bed boiler drives a turbine so that electricity is generated. In the power plant, an air cooler is situated on a duct for conveying the compressed air from the compressor to the boiler or at an inlet of the compressor. Alternatively, there may be provided a device for conveying the compressed air from the compressor by way of the air cooler to a space formed by the fluidized-bed boiler and the pressure vessel of the pressurized fluidized-bed boiler. During operation, the compressed air is cooled to a temperature level allowable for the pressure vessel before it is supplied to the boiler.

8 Claims, 12 Drawing Sheets

PRESSURIZED FLUIDIZED-BED BOILER POWER PLANT

BACKGROUND OF THE INVENTION

1. Field of the Invention

The present invention relates to a pressurized fluidized-bed boiler power plant comprising a pressurized fluidized-bed boiler and a compressor for supplying air for the boiler, particularly to a plant design and a controlling method for a pressurized fluidized-bed boiler power plant employing a single-shaft gas turbine.

2. Description of the Related Art

Pressurized fluidized-bed boiler power plants using coal are being developed to replace conventional dust-coal combustion steam plants. The compressor for supplying air to the boiler in a pressurized fluidized-bed boiler power plant normally uses a two-shaft gas turbine to control the air flow when there is a partial load in the boiler, as described in EPRI, GS-6478 (1989), pp. 3-1-1 to 3-1-14. In this type of plant, an intermediate cooler for reducing the power required to drive the compressors is provided between the low-pressure and the high-pressure air compressors. Thus, such a construction is able to reduce the air temperature at the outlet of the high-pressure air compressor, i.e., at the inlet of the pressurized fluidized-bed boiler.

However, because a two-shaft gas turbine has a complicated structure and requires a means for preventing overspeeding, which is likely to occur when a load thereto is discontinued, its development requires substantial time and cost. Therefore, consideration has been given to a conventional but reliable single-shaft gas turbine to be used in a pressurized fluidized-bed boiler power plant.

A conventional pressurized fluidized-bed boiler power plant employing a single-shaft gas turbine has no means for preventing the air temperature at the outlet of the compressor or the inlet of the boiler from rising too high. Therefore, when the air temperature at the inlet of the boiler is above 320° C., the temperature of the pressure vessel, i.e., a component of the boiler, rises above 350° C. In order for the pressure vessel to endure such a high temperature, it has to be made of an expensive alloy steel instead of inexpensive carbon steel, or the wall thickness thereof has to be increased by 20%. In the latter case, the time required for X-ray inspection of the pressure vessel is doubled because the inspection time increases in proportion to the thickness to the fourth power. Thus, the production cost rises, and also, the thermal stress during operation increases.

SUMMARY OF THE INVENTION

A first object of the present invention is to provide a pressurized fluidized-bed boiler power plant comprising a single-shaft gas turbine.

A second object of the present invention is to provide a pressurized fluidized-bed boiler power plant in which the temperature of the pressurized vessel during operation will not exceed the allowable level.

In order to achieve the first object, a pressurized fluidized-bed boiler power plant, according to the present invention, comprises a pressurized fluidized-bed boiler and an air cooler which is provided on a duct conveying combustion air from the compressor to the boiler.

Also, a coolant of the air cooler utilizes external cooling water, or a mixed medium containing coal and water supplied to the boiler, or water supplied to the boiler.

In another embodiment of the present invention, an air cooler is provided at the inlet of a compressor which supplies combustion air to the boiler.

In still another embodiment, at least one portion of the casing of the compressor is cooled.

In order to achieve the second object, a pressurized fluidized-bed boiler power plant, according to the present invention, comprises an air cooler which is provided on a duct conveying combustion air from the compressor to the pressurized fluidized-bed boiler, wherein the coolant of the air cooler controls the air temperature at the inlet of the boiler.

Further, any of the following may be used for controlling the air temperature at the inlet of the boiler: the temperature of the pressure vessel of the boiler; the air temperature at the inlet of the pressure vessel; and the plant load.

At the air cooler, the coolant cools the air heated by the compressor before the air flows into the pressurized fluidized-bed boiler. The temperature T2 (°C.) of the pressurized air at the outlet of the compressor is obtained by the following equation:

$$T2 = (T1 + 273) \times (P2/P1)^{(K-1)/K\eta cp} - 273 \quad (1)$$

where
- $T1$ = atmosphere temperature (°C.)
- $P1$ = atmosphere pressure (kg/cm²a)
- $P2$ = pressure at the compressor outlet (kg/cm²a)
- $\eta cp$ = polytropic efficiency of the compressor (%)
- $K$ = ratio of specific heat of air The air temperature T2 at the outlet of the compressor varies as the pressure ratio $R = P2/P1$ and the polytropic efficiency $\eta cp$ are changed as shown in the following table.

| | $\eta cp$ | | |
|---|---|---|---|
| R | 0.86 | 0.88 | 0.90 |
| 8 | 311° C. | 302° C. | 294° C. |
| 10 | 356 | 346 | 336 |
| 12 | 396 | 383 | 371 |
| 14 | 431 | 417 | 404 |

(T1 = 20° C., K = 1.40)

The pressure ratio R of an existing large-scale single-shaft gas turbine used in a power plant is 10 or greater, and the polytropic efficiency $\eta cp$ is about 0.88. The air temperature at the outlet of the compressor T2 reaches above 340° C., and goes up further when the atmosphere temperature rises.

The plant contains media which can exchange heat with the air, such as the boiler feedwater and the mixed medium containing coal and water. The media directly and indirectly take heat from the air being supplied to the boiler, so that the air temperature can be reduced to 320° C. or even less. As an alternative method, cooling water outside the plant may be used to reduce the air temperature.

The air temperature at the outlet of the compressor can also be reduced if an air cooler is provided at the inlet of the compressor.

Further, the air temperature can be reduced if a coolant cools at least one portion of the compressor casing.

The air temperature at the outlet of the air cooler provided on a duct conveying combustion gas from the compressor to the boiler is controlled by changing the flow of the coolant. It is not controlled according to the temperature of the pressure vessel containing the boiler body, because the temperature thereof changes as the temperature of the boiler body changes, depending on the operating conditions. Thus, the temperature of the pressure vessel can be maintained below the allowable level for the material, independent of the operating conditions.

DESCRIPTION OF THE PREFERRED EMBODIMENTS

One embodiment of the present invention will be described with reference to FIG. 1.

The outlet of an air compressor 1 and a pressurized fluidized-bed boiler 3 are connected to an air-supplying duct 16 which has an air cooler 15. The boiler 3 is connected through a cyclone 4 and a fine dust remover 5 to a gas turbine 2 by a duct line. The outlet of the gas turbine 2 is connected by a duct to a water heater 13 using the waste heat.

The air compressor 1 and the gas turbine 2 are drivingly interconnected, composing one shaft line which also includes a gas turbine generator 14.

A steam turbine system is composed of a high-pressure steam turbine 6, a reheat steam turbine 7 and a low-pressure steam turbine 8, and is connected to a steam turbine generator 9. The outlet of the low-pressure steam turbine 8 is connected by a duct to a condenser 10.

Feedwater 110 from the condenser 10 is sent to a deaerator 11 where the boiler feedwater is deaired by steam bled off from the low-pressure steam turbine 8, and then it is pressurized by a water-supplying pump 12. A portion of the water in a water-supplying duct 105 is sent through a water supplying duct 106 to a waste-heat-utilizing water heater 13, where it is heated by the combustion exhaust gas 104, and then it is supplied to the pressurized fluidized-bed boiler 3. The remainder of the water is sent through a water-supplying duct 107 to the air cooler 15, where the water cools the air coming through the air-supplying duct 16 from the air compressor. After cooling the air, it is also supplied to the pressurized fluidized-bed boiler 3. The water temperature at the outlet of the condenser 10 is generally about 110° C., which is low enough to reduce the air temperature at the outlet of the air cooler 15 to 320° C., or even lower.

Also, a duct 101 is connected to the pressurized fluidized-bed boiler 3, through which fuel and fluidization medium are supplied.

Since the sensible heat resulting from the cooling of the air at the inlet of the boiler 3 is recycled to the steam system, this embodiment maintains high heat-efficiency.

Figure 2:
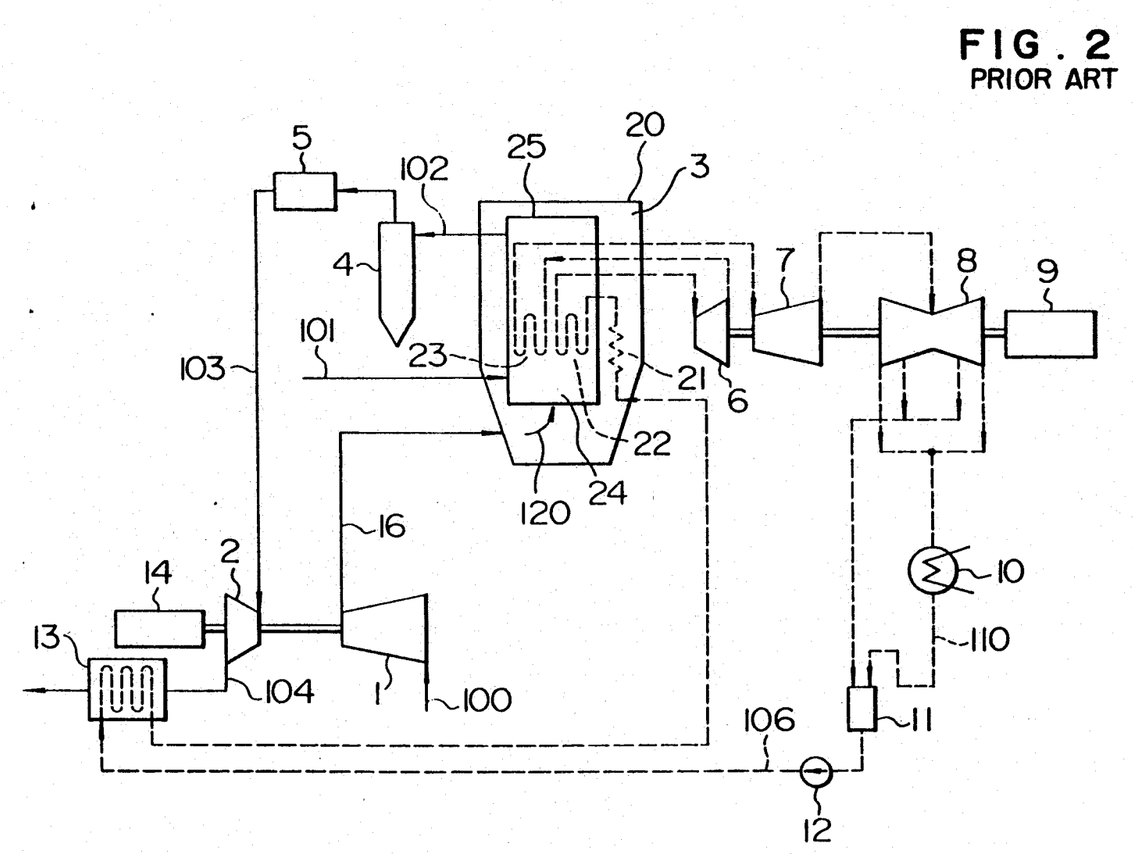
FIG. 2 illustrates the inside of a conventional pressurized fluidized-bed boiler.

The structure of the pressured fluidized-be boiler 3 will be described in detail with reference to FIG. 2. The boiler 3 includes a fluidized-bed boiler body 25 and a pressure vessel 20 containing the boiler body 25. Inside the boiler body 25, a fluidized bed 24 is formed by fuel, i.e., limestone, and a medium for fluidization (limestone is usually used also as a desulfurizing agent.). In the fluidized bed 24, a feedwater heater-evaporator-superheater 22 and a reheater 23 are provided. The boiler body 25 is covered with a feedwater heater-evaporator 21. The fuel and the fluidization medium from a duct 101 is sent through the pressure vessel 20 to the inside of the boiler body 25. The air from the air-supplying duct 16 is sent into the pressure vessel 20, where it flows between the walls of the pressure vessel 20 and the boiler body 25, and then it is supplied into the boiler body 25, burning the fuel therein. The combustion gas 102 is let out through the pressure vessel 20 to the cyclone 4. On the other hand, the water goes through the water heater-evaporator 21, where it is heated and evaporated by the combustion heat. The water heater-evaporator 21, surrounding the boiler body 25, reduces the heat transmission from the boiler body to the pressure vessel 20, i.e., prevents overheating of the pressure vessel 20. The air 120 supplied in the pressure vessel 20 also cools the pressure vessel 20 before flowing into the boiler body 25.

Figure 3:
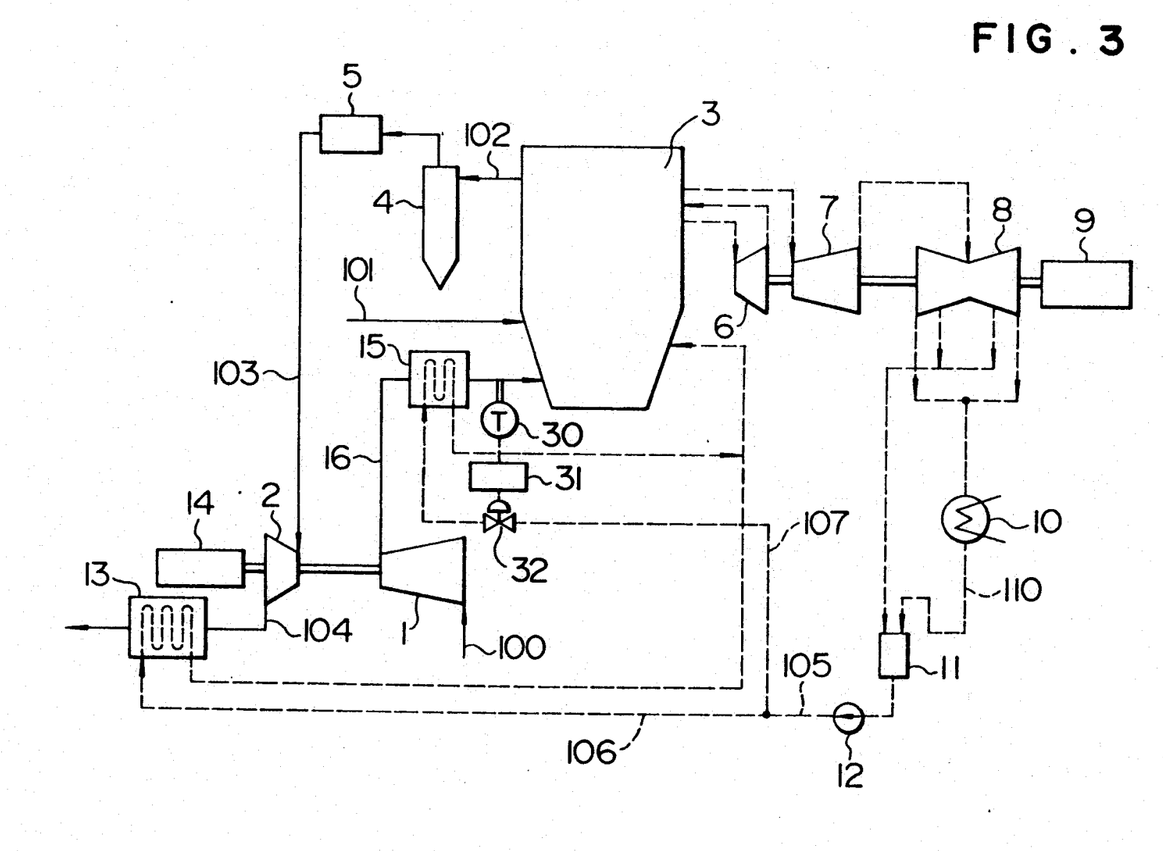

Another embodiment of the present invention is illustrated in FIG. 3. This embodiment differs from the embodiment shown in FIG. 1 in that: a control valve 32 is provided on the water-supplying duct 107; a temperature sensor 30 is provided on the air-supplying duct 16 between the air cooler 15 and the fluidized-bed boiler 3; and a controlling unit 31 of the control valve 32 receives signals from the temperature sensor 30.

The controlling unit 31 is pre-set to a value equal to the upper limit of the supply-air temperature allowable in the boiler 3. The unit 31 compares the signals from the temperature sensor 30 with the set value, and accordingly, controls the opening of the control valve 32, i.e., controls the flow of the water into the air cooler 15 so that the temperature of the air supplied to the boiler 3 will not exceed the upper limit.

Thus, this embodiment has an advantage in that though the air temperature at the outlet of the air compressor is likely to change depending on atmospheric temperature or the like, the air temperature at the inlet of the fluidized-bed boiler can be maintained within the allowable range.

Figure 4:
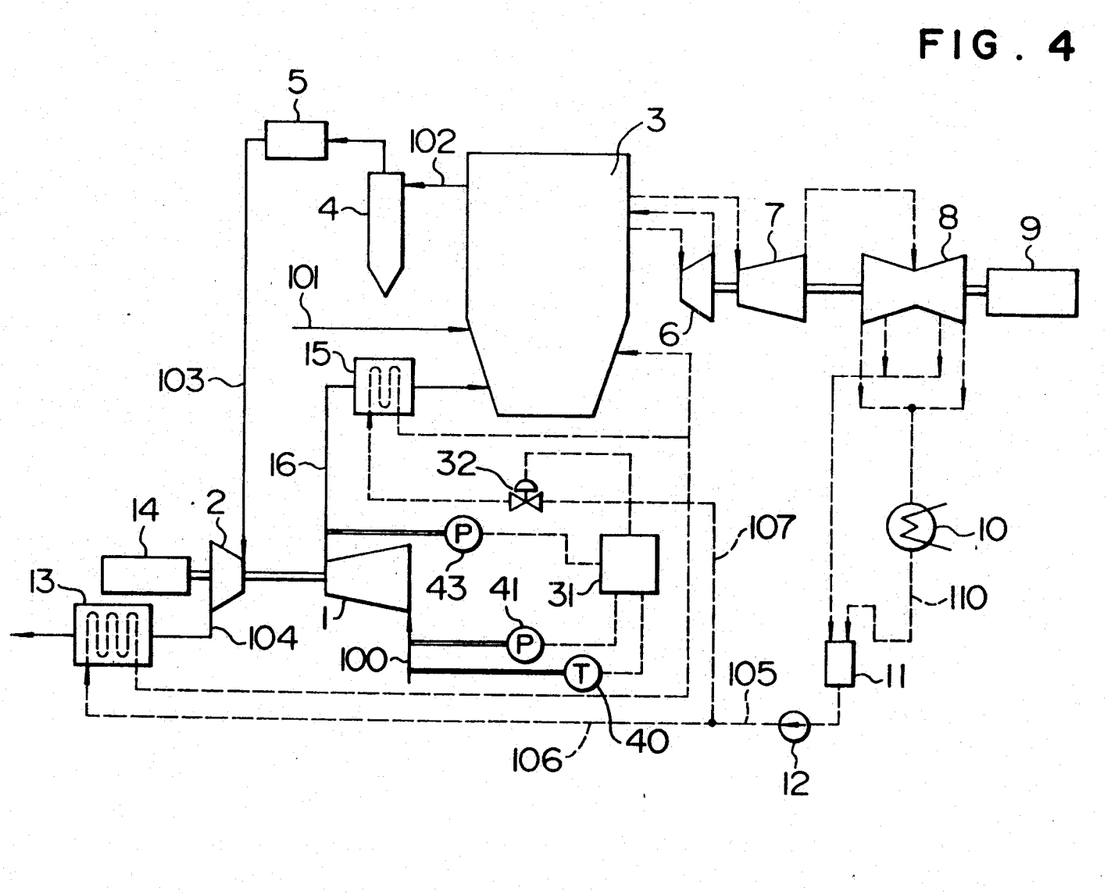

Still another embodiment of the present invention is illustrated in FIG. 4. This embodiment differs from the embodiment shown in FIG. 3 in that, instead of the temperature sensor 30, an inlet temperature sensor 40 and an inlet pressure sensor 41 are provided at the inlet of the air compressor 1, and an outlet pressure sensor 43 is provided at the outlet thereof.

The inlet temperature and pressure sensors 40, 41 practically measure atmospheric temperature and pressure. Generally speaking, a pressure sensor can take measurement faster than a temperature sensor does. Therefore, the controlling unit 31 can calculate the air temperature at the outlet of the air compressor 1 from the values of the above three measurements through the equation (1) already stated above.

$$T2 = (T1+273) \times (P2/P1)^{(K-1)/K\eta cp} - 273 \qquad (1)$$

According to the calculated value, the unit 31 controls the control valve 32.

This embodiment has an advantage in that it can quickly respond to the temperature change at the outlet of the air compressor.

Instead of the supplied air temperature, the temperatures of the pressure vessel of the boiler may be measured to provide signals to the control unit. Thus, the temperature of the pressure vessel, whose protection is the essential object of the control, can be directly controlled. Therefore, such an embodiment provides a reliable control responding to a local temperature change inside the boiler.

Instead, the power plant load may be measured to provide signals to the control unit. In a pressurized fluidized-bed boiler power plant, pressure inside the boiler has to be proportional to the boiler load; consequently, the pressure inside the boiler varies in proportion to the plant load. Thus, the control system can be simplified.

Figure 5:
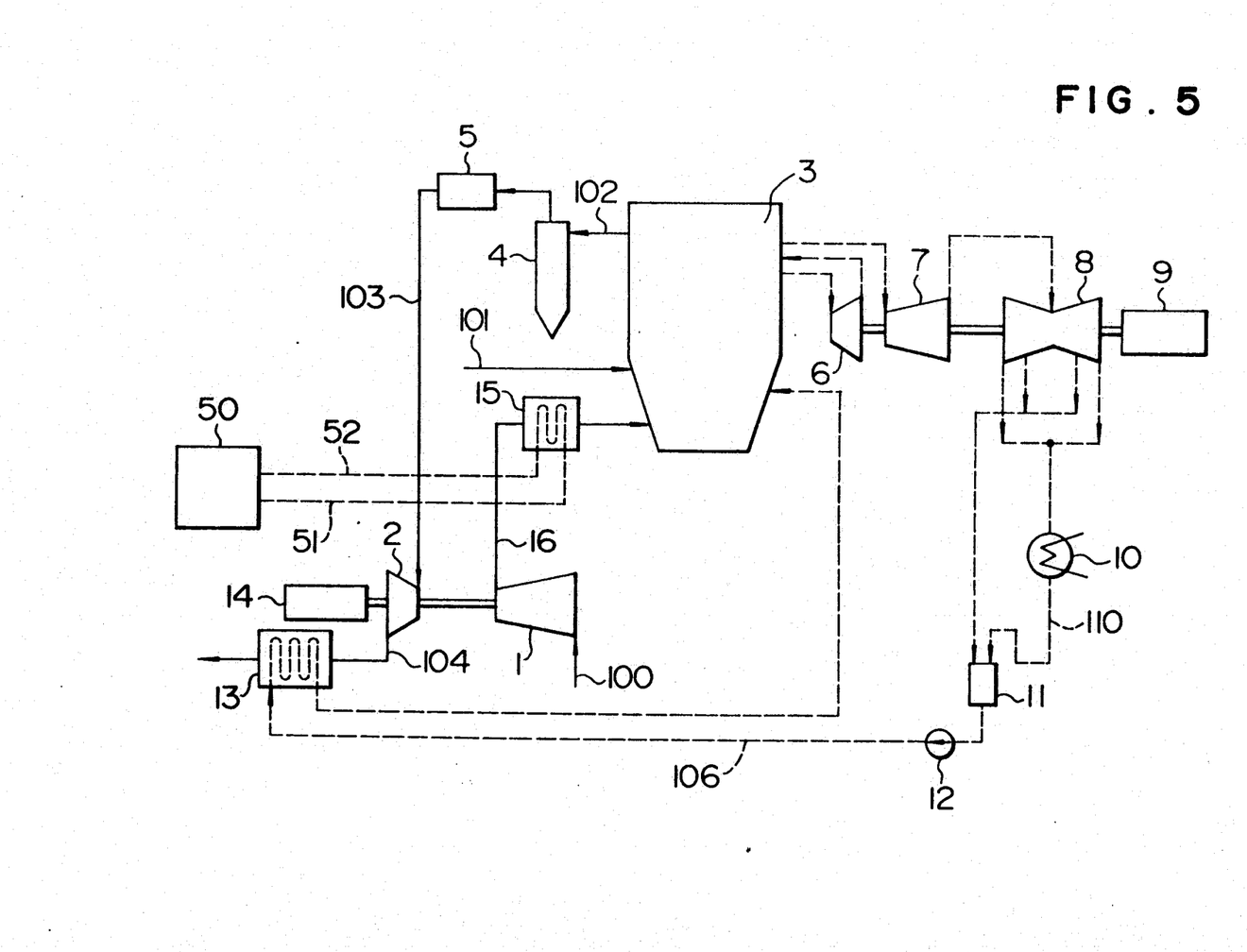

Another embodiment of the present invention is illustrated in FIG. 5. This embodiment differs from the embodiment shown in FIG. 1 in that, instead of a system in which a portion of the boiler feedwater is distributed to the air cooler 15, an external water cooler 50 supplies cooled water specifically to the air cooler 15 through a water-supplying duct 51, and recovers the water which is used to cool the air being supplied to the boiler 3, through a water-recovering duct 52.

The external water cooler is independent of the operating conditions of the pressurized fluidized-bed boiler power plant. Thus, this embodiment provides a reliable or stable cooling of the air. The structure of the air cooler can be simplified when the pressure of the cooling water is reduced. Also, the embodiment puts out heat usable to other purpose.

Still another embodiment employs a gas turbine motor-generator or the like which can provide the plant with power, instead of the gas turbine generator shown in FIG. 5. In such an embodiment, when the steam system has something wrong and the boiler must be cooled by some other means, the gas turbine motor-generator is driven by an external power source to drive the air compressor and the air is cooled by water supplied from the external cooler. In this way, the cooled air can be supplied to cool the pressurized fluidized-bed boiler.

Figure 6:
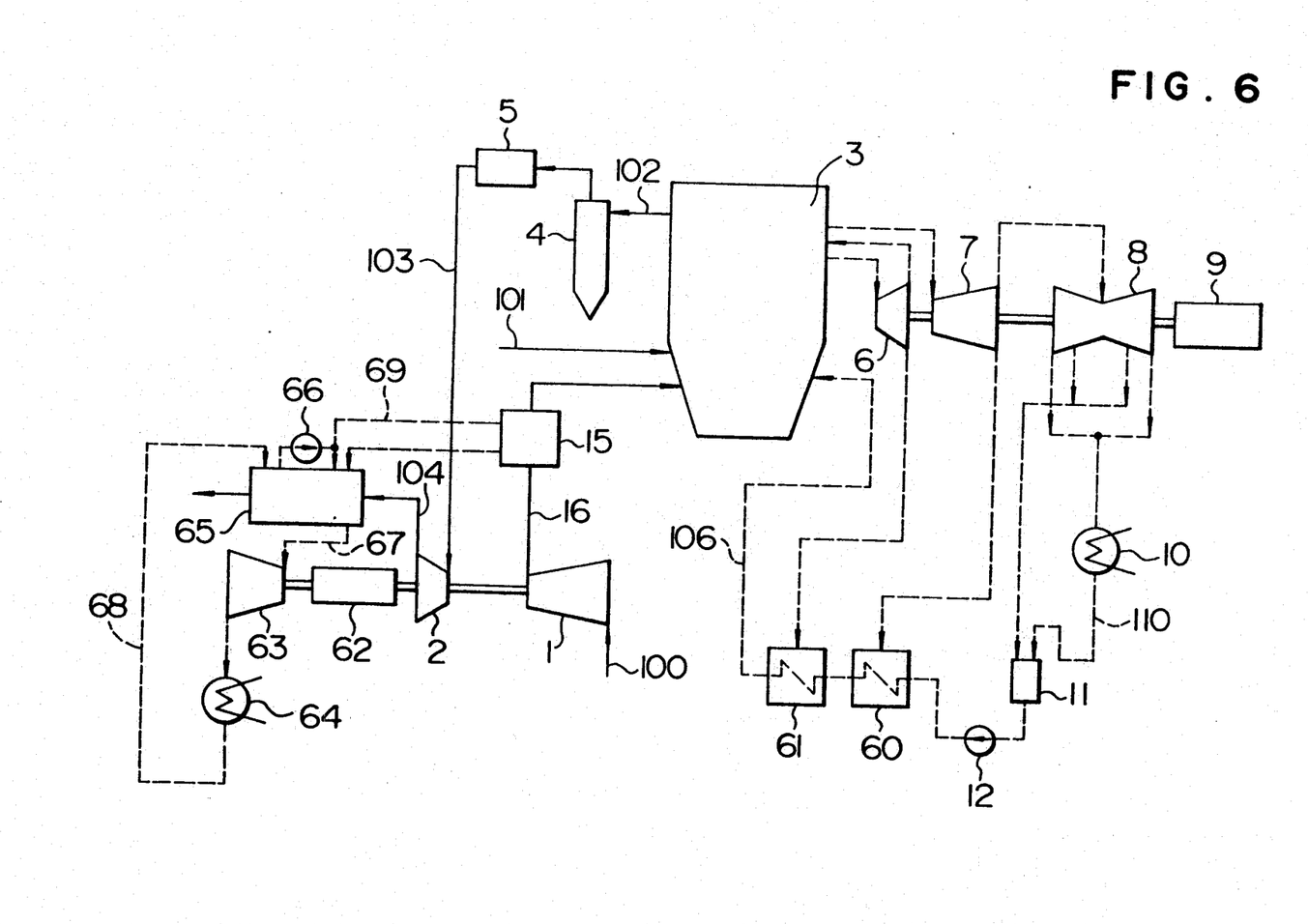

Another embodiment is illustrated in FIG. 6. This embodiment differs from the embodiment shown in FIG. 1 in that: water heaters 60 and 61 are provided at the outlet of the water supplying pump 12; a waste-heat recovering boiler 65 is provided at the outlet of the gas turbine 2; an auxiliary steam turbine 63 is provided on the shaft on which the gas turbine generator 62 is located; a steam duct 67 is provided between the waste-heat recovering boiler 65 and the auxiliary steam turbine 63; a water-supplying duct 68 is provided between the outlet of the auxiliary steam turbine 63 and the waste-heat recovering boiler 65; a condenser 64 of an auxiliary steam system is provided on the water supplying duct 68; a water supplying pump 66 is provided at the waste-heat recovering boiler 65; and the outlet of the water supplying pump 66 is connected to the air cooler 15 by a water supplying duct 69.

The combustion gas 104 from the gas turbine 2 flows into the waste-heat recovering boiler 65, where it generates steam. The steam flows through the steam duct 67 into the auxiliary steam turbine 63 and drives the turbine 63. Then, the steam is condensed into water by the condenser 64. The water returns to the heat recovering boiler 65 through the water supplying duct 68. Then, the water is pressurized by the water supplying pump 66, and a part of the water is sent through the water supplying duct 69 to the air cooler 15, where it cools the air flowing out of the compressor 1. Then, air having a temperature within the allowable range is supplied to the pressurized fluidized-bed boiler 3. The water warmed by the heat transferred from the high-temperature air in the air cooler 15 returns to the heat-recovering boiler 65, where it is evaporated and superheated.

At the water heaters 60, 61 provided on the ducting system of the main steam turbine, the water is heated by steam bled off from the main steam turbine. Then, it is supplied to the pressurized fluidized-bed boiler 3.

Thus, the feedwater temperature at the main steam turbine is raised by the steam bled off from the main steam turbine, so that the heat loss at the condenser of the main steam turbine system can be reduced. The heat removed from the air is used by the auxiliary steam turbine, and thus heat efficiency of the power plant can be improved.

Figure 7:
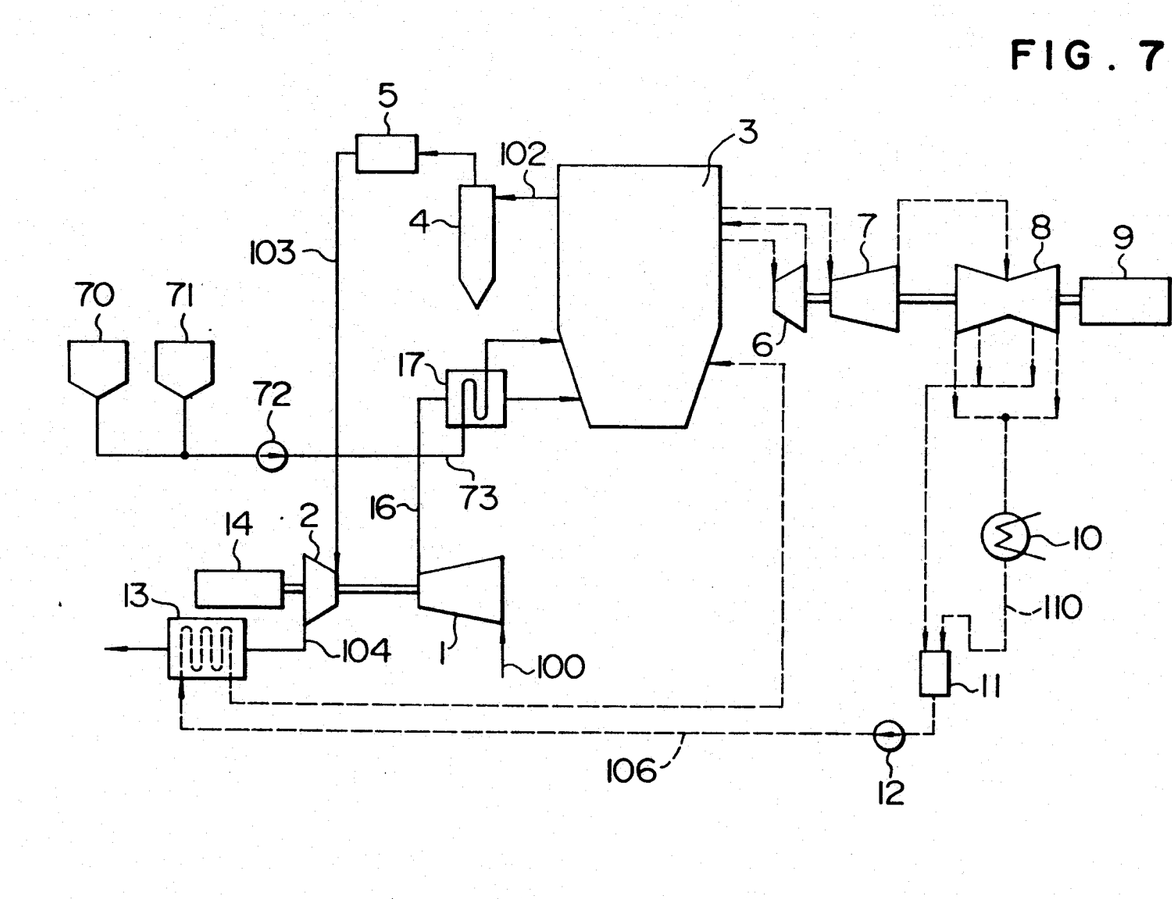

Still another embodiment of the present invention is illustrated in FIG. 7. This embodiment differs from the embodiment shown in FIG. 1 in that the coolant of the air cooler 17 is the fuel (coal) and the fluidized medium.

A coal hopper 70 and a fluidization medium hopper 71 are connected to the pressurized fluidized-bed boiler 3 by a coal supplying duct 73, on which a supplying pump 72 and the air cooler 17 are provided.

The ground coal and the fluidization medium stored in the coal and fluidization medium hopper 70, 71 are mixed with water. The mixture is pressurized by the supplying pump 72 and is sent through the coal supplying duct 73 to the air cooler 17, where it receives heat from the hot air coming out of the compressor 1. Thus, the air being supplied to the boiler 3 is cooled while the mixture of coal, fluidization medium and water also being supplied to the boiler 3 is warmed up. In other words, the sensible heat from the air is recycled into the fuel system. Therefore, high heat efficiency can be maintained.

Figure 8:
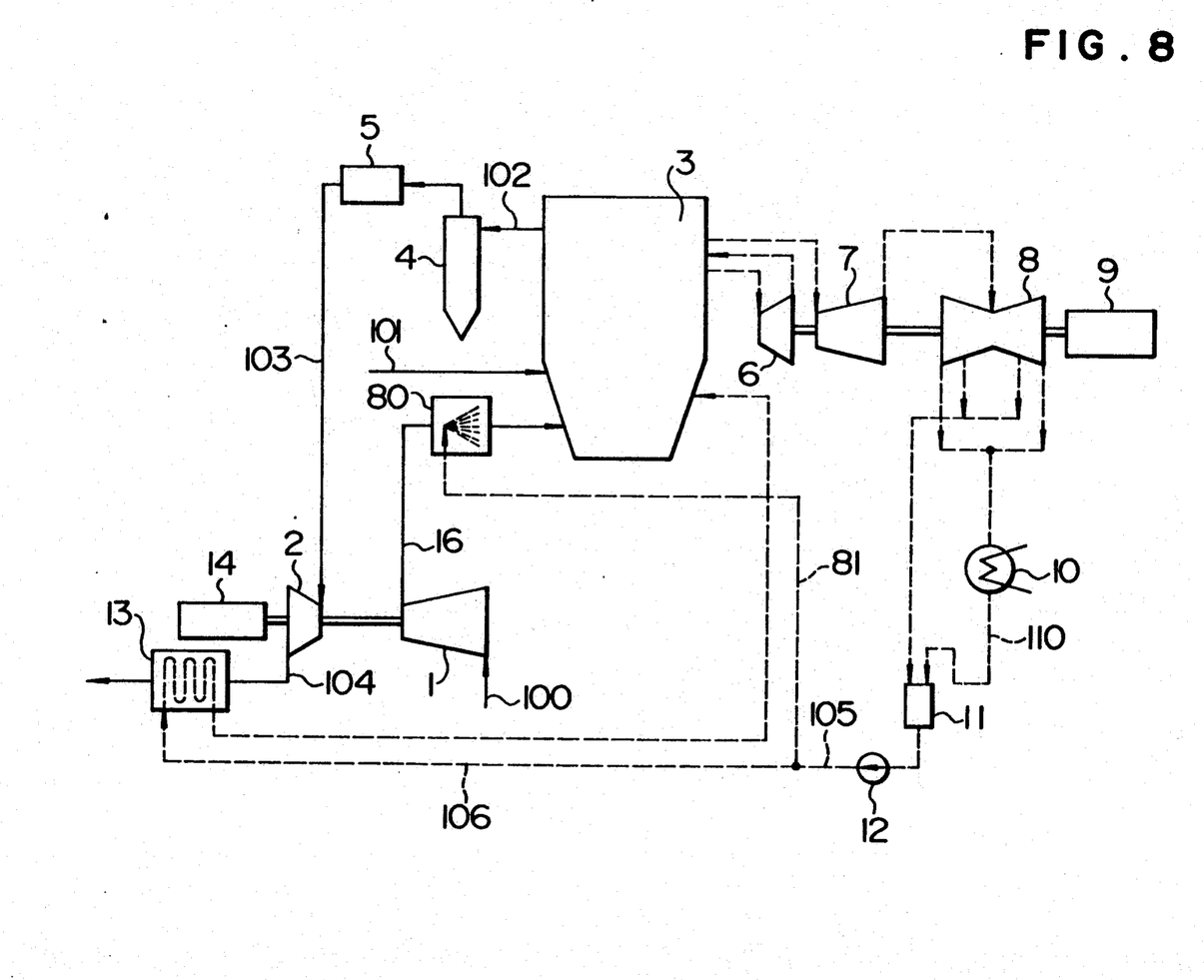

Still another embodiment of the present invention is illustrated in FIG. 8. This embodiment differs from the embodiment shown in FIG. 1 in that a direct contact heat exchanger is used for an air cooler 80 provided on the air supplying duct 16. The air cooler 80 is connected to the water supplying duct 105 by the cooling water supplying duct 81.

The hot air is sent from the compressor 1 to the air cooler 80 while the water pressurized by the water supplying pump 12 flows through the water supplying duct 105 and then the cooling water supplying duct 81 into the air cooler 80. In the air cooler 80, the pressurized water is sprayed into the hot air. The air is cooled, and the sprayed water changes into steam. The mixture of the air and the steam is supplied to the boiler 3.

Since water is sprayed, evaporated and thus mixed with the air for combustion and then the mixture is supplied to the pressurized fluidized-bed boiler, this embodiment has the following advantages: NOx produced by combustion can be reduced; the flow of the combustion gas in the gas turbine increases, i.e., the power thereof increases; and the temperature in the boiler can be quickly dropped by increasing the water supply for the spraying.

Figure 9:
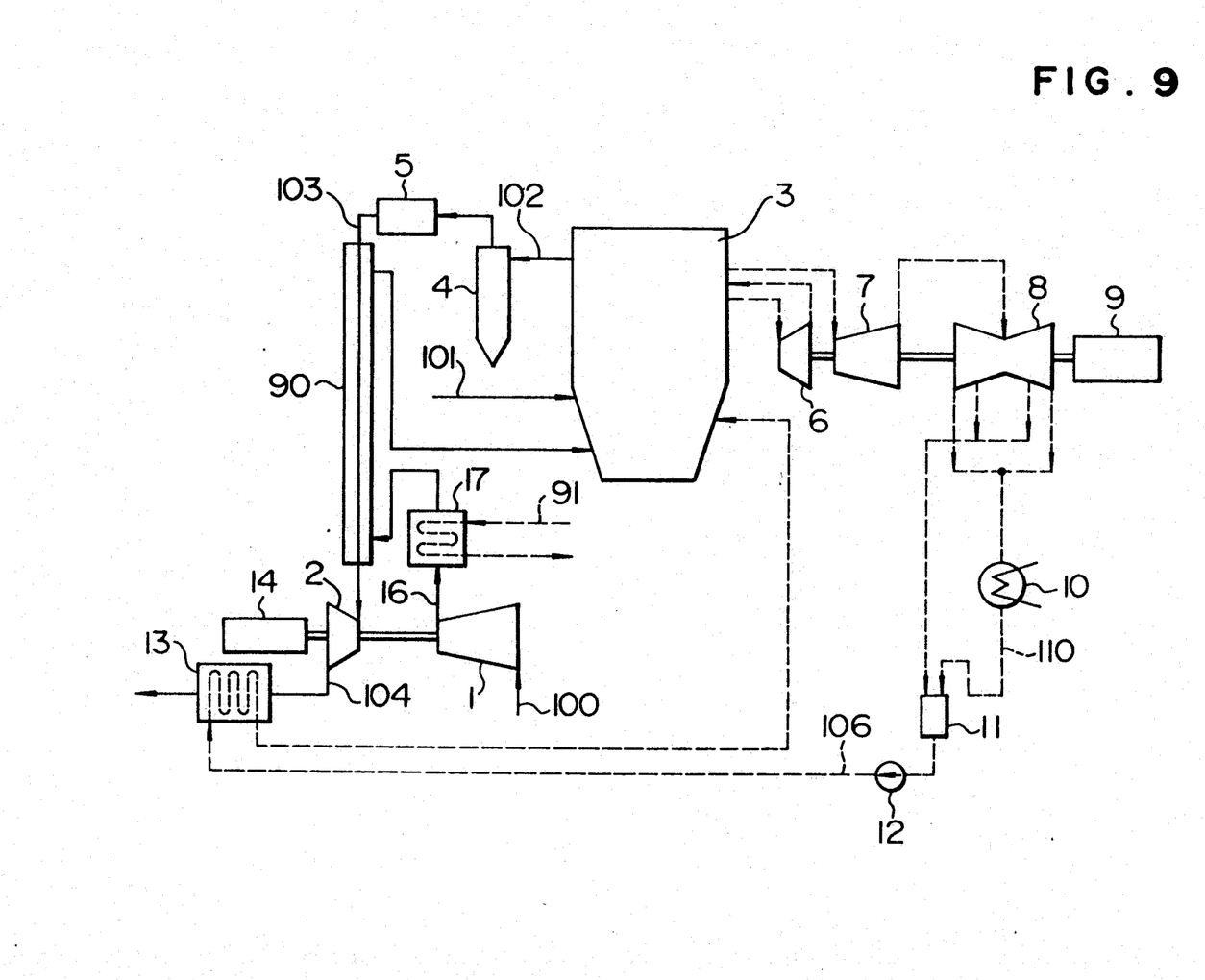

Still another embodiment of the present invention is illustrated in FIG. 9. In this embodiment, the air-supplying duct 16 connecting the compressor 1 and the boiler 3 contains another duct 103 connecting the boiler 3 and the gas turbine 2, thus forming a double layered duct 90. The outer duct thereof conveys air and the inner duct conveys clean combustion gas. The air cooler 17 having a cooling water supplying duct 91 is provided on the duct 16 between the compressor 1 and the double layered duct 90.

In the double layered duct 90, the combustion-gas duct, i.e., the inner duct, conveying the gas of high temperature (about 850° C.) and high pressure is actively cooled by the air flowing through the outer duct, i.e., the air cooled in the air cooler 17. The double layered duct 90 may also be designed so that the outer duct conveys less cooled and highly pressurized air to reduce the pressure difference between the air and the combustion gas flowing through the inner duct. In such a double layered duct, the combustion gas duct is not required to be very strong or durable, and thus an inexpensive material can be used for the duct.

Figure 10:
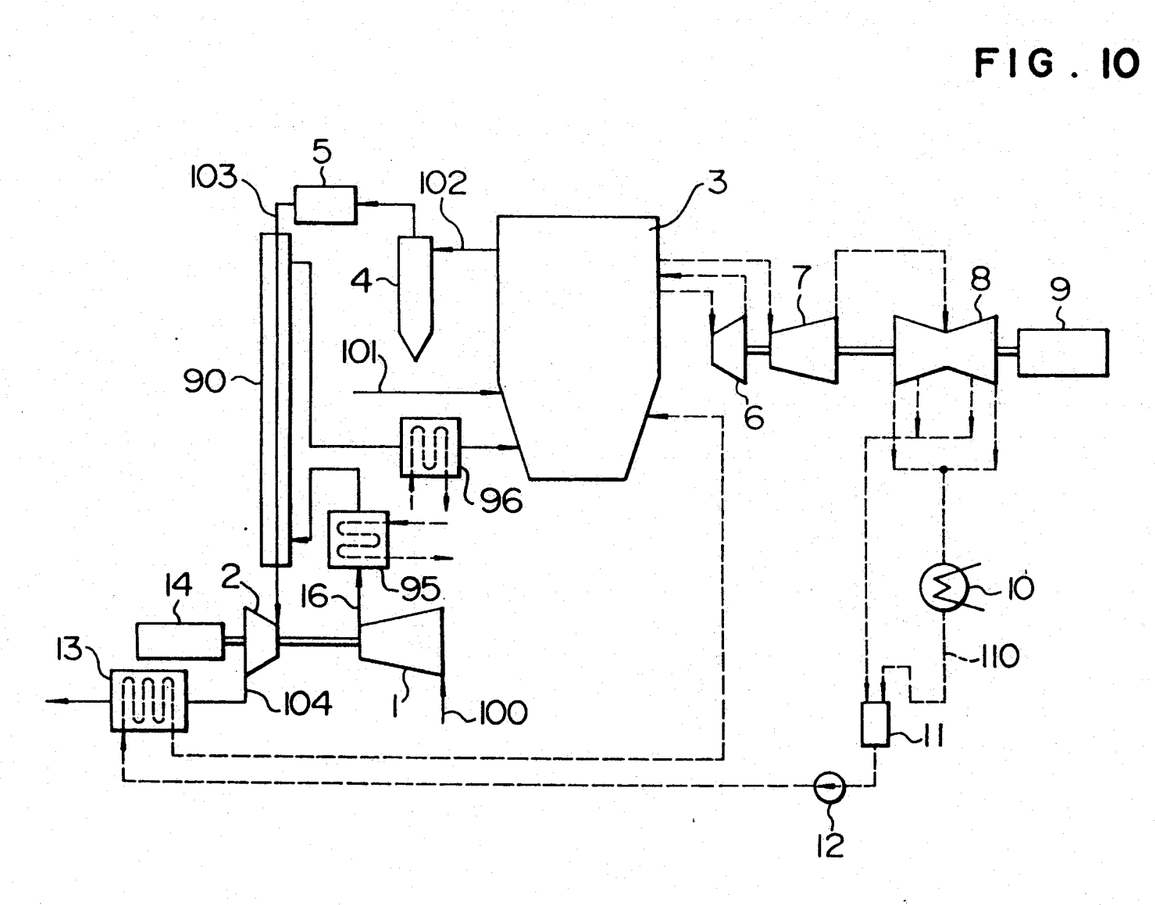

Still another embodiment of the present invention is illustrated in FIG. 10. This embodiment differs from the embodiment shown in FIG. 9 in that, in addition to the air cooler 95 (17 in FIG. 9) provided between the compressor 1 and the double layered duct 90, a second air cooler 96 is provided between the double layered duct 90 and the boiler 3.

The second air cooler 96 cools the air warmed by heat transferred from the combustion gas in the double layered duct 90, thus maintaining the temperature of the air flowing into the boiler 3 within the allowable range.

Thus, this embodiment provides high reliability in maintaining the air temperature at the inlet of the boiler within the allowable range.

In still another embodiment of the present invention, an air cooler is provided in a pressurized fluidized-bed boiler.

Such design facilitates reducing the plant size. Particularly when water being supplied to the boiler is used as a coolant, the ducting system for the coolant can be simplified.

In another embodiment of the present invention, a plurality of air supplying ducts are provided between an air compressor and a pressurized fluidized-bed boiler, and at least one of the ducts is provided with an air cooler. The air cooled in the air cooler mixes with the air from the other ducts, resulting in the air temperature at the inlet of the boiler being within the allowable range.

The air temperature at the inlet of the boiler can be controlled by varying the air flow in the duct having the air cooler, so that the air temperature can be changed quickly.

In still another embodiment of the present invention, an air cooler is provided at the inlet of an air compressor. Since the air is cooled at the air cooler before being pressurized by the compressor, the temperature at the outlet of the compressor is reduced as much as it is reduced at the air cooler.

The reduced air temperature saves the power required for driving the compressor, resulting in an increase in the power of the gas turbine generator.

In another embodiment of the present invention, at least a portion of the compressor casing is cooled. As in the above embodiment, the air temperature at the outlet of the compressor is reduced as much as it is reduced in the compressor.

In addition to the reduction of the power required for driving the compressor, this embodiment has an advantage in that since the air is cooled during its pressurization, a medium in the plant, such as water for the boiler, can be used for the coolant.

Figure 11:
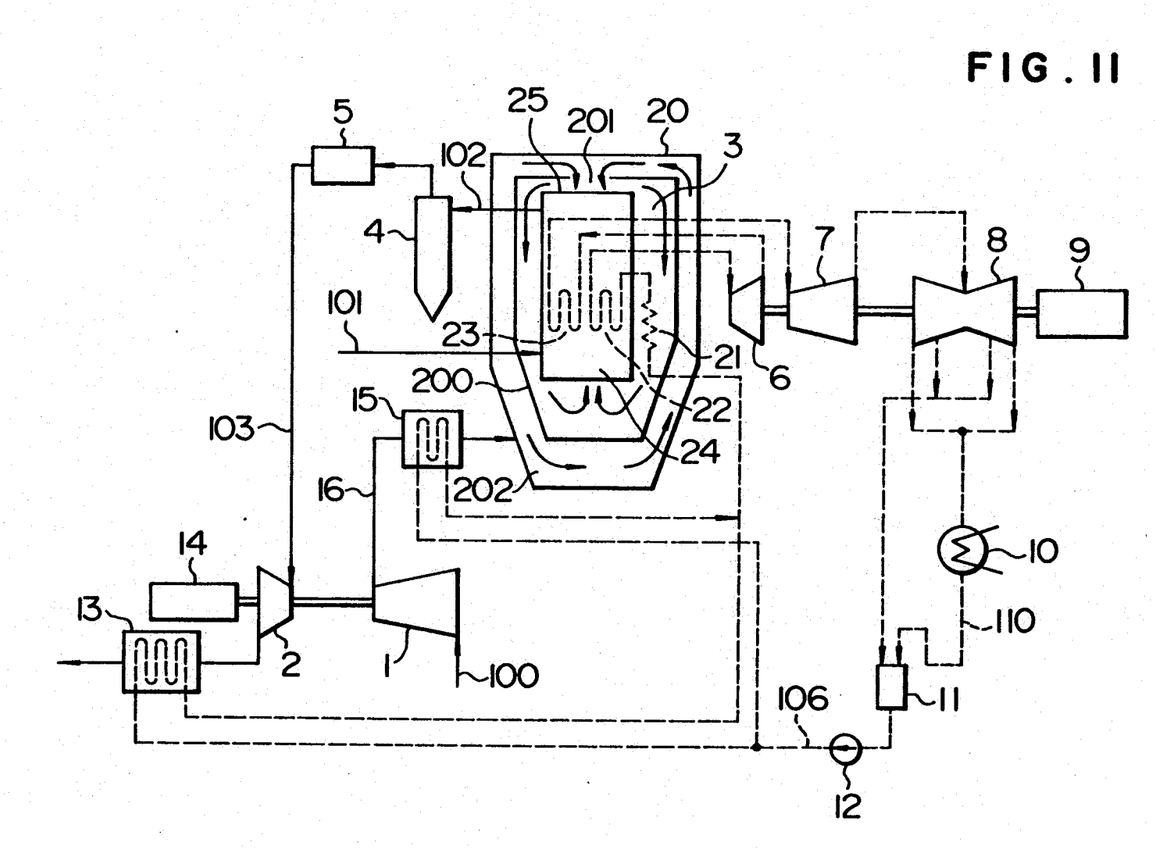

Still another embodiment of the present invention is illustrated in FIG. 11. This embodiment differs from the embodiment shown in FIG. 1 in that a heat insulating shield 200 is provided inside the pressure vessel 20 of the boiler 3 and contains the boiler body 25.

Figure 1:
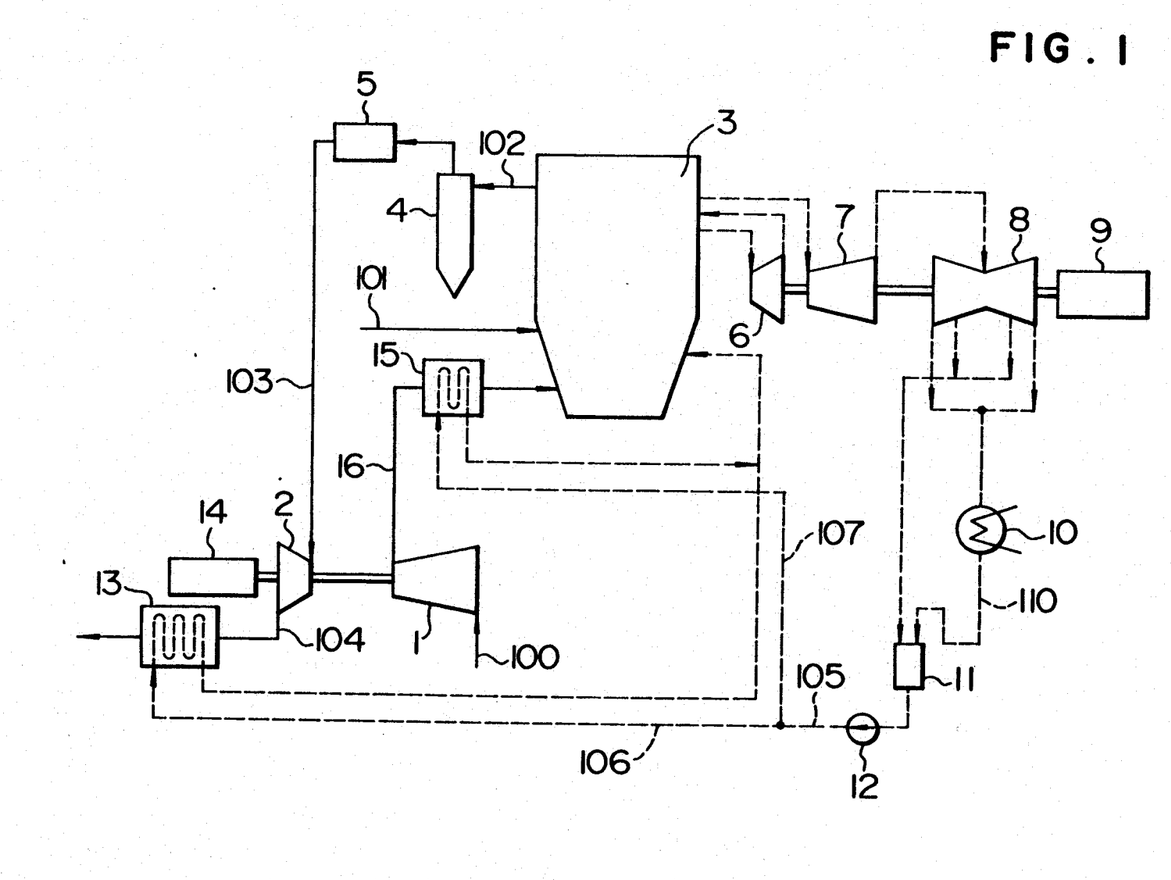
FIGS. 1 and 3 to 12 illustrate embodiments of the present invention.

An air compressor 1 and a pressure vessel 20 of a boiler are connected by an air supplying duct 16, on which an air cooler 15 is provided, as in the embodiment shown in FIG. 1. A cooling air passage 202 is formed between the insulating shield 200 and the inner wall of the pressure vessel 20. The insulating shield 200 has a hole 201.

The air pressurized by the compressor 1 is cooled at the air cooler 15, and then flows into the pressure vessel 20, where it goes through the cooling air passage 202. By shaping the insulating shield properly, this passage 202 can be formed so that the inner wall of the pressure vessel can be effectively cooled. The air flows through the passage 202 as it cools the pressure vessel 20, and then goes through the hole 201 of the shield 200 into the space between the shield 200 and the fluidized boiler body 25. The air is finally supplied to the boiler body 25 for combustion therein.

Depending on the size, number and location of the hole 201, measures for efficiently cooling the high-temperature portion of the boiler body 25, such as impingement cooling method, can be utilized.

Since the insulating shield 200 is provided in this embodiment, the pressure vessel is efficiently cooled by low temperature air flowing through the cooling air passage, and also, the heat radiation from the boiler body is shielded by the insulating shield. Thus, the temperature of the pressure vessel can be maintained low.

Figure 12:
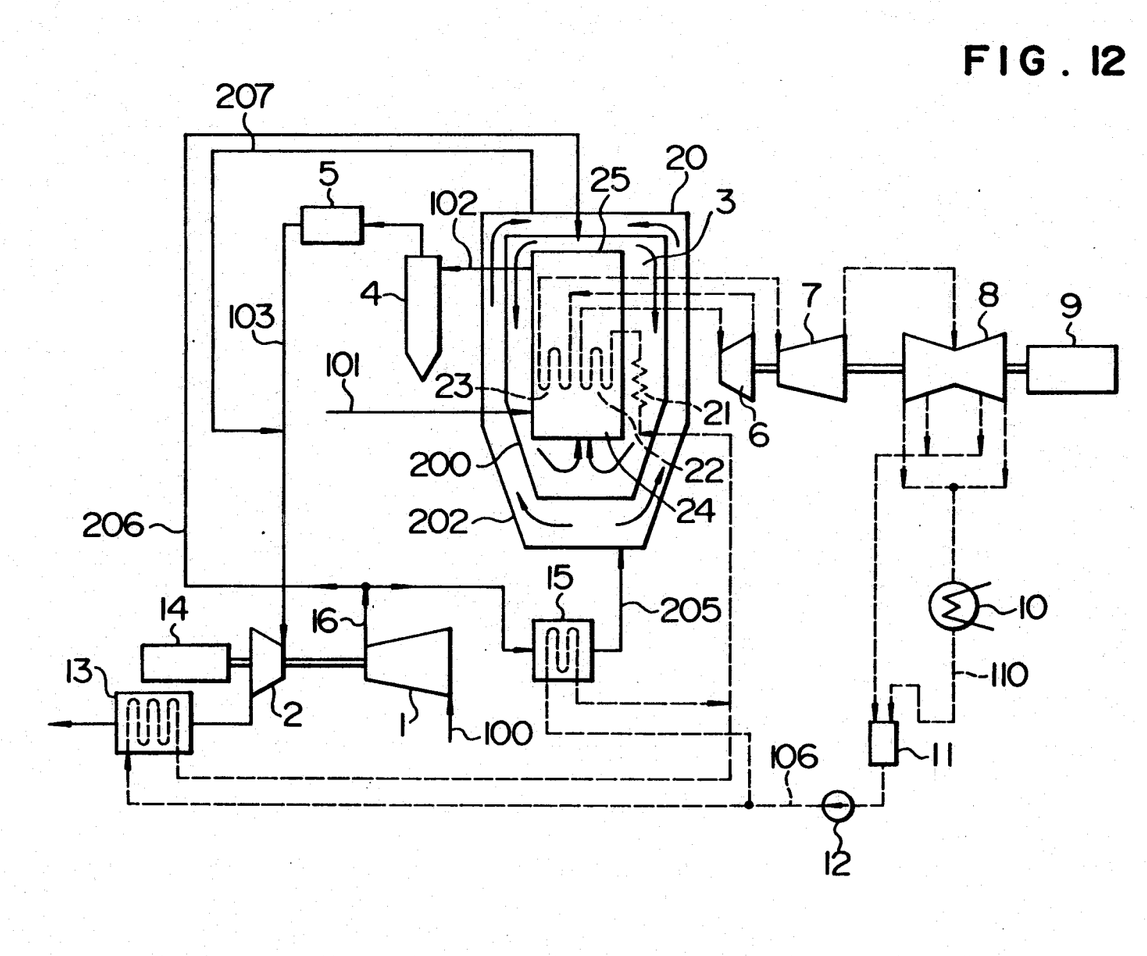

Still another embodiment of the present invention is illustrated in FIG. 12. This embodiment differs from the embodiment shown in FIG. 11 in that the insulating shield 200 separates the inside of the insulating shield from the outside without the provision of a hole 201 which connects the outside and inside of the shield 200.

The air supplying duct 16 connected to the compressor 1 is branched into two ducts: an air supplying duct 205 having the air cooler 15 and connected to the cooling air passage 202 defined by the pressure vessel 20 and the insulating shield 200; and an air supplying duct 206 connected to a space formed by the shield 200 and the boiler body 25. The cooling air passage 202 is connected to a hot air duct 207 which is connected to a duct 103 between the boiler body 25 and the gas turbine 2.

After the air from the compressor 1 flows through the air supplying duct 16, a portion of the air goes through the air supplying duct 205 and is cooled at the air cooler 15. Then, it flows into the pressure vessel 20, where it goes through the passage 202 between the pressure vessel 20 and the shield 200, cooling the pressure vessel 20. The air heated by the heat transferred from the pressure vessel 20 and the shield 200 flows through the hot air duct 207 to the inlet of the gas turbine 2, where the air expands and provides power for the turbine 2.

On the other hand, the remainder of the air goes through the air supplying duct 206 into the space between the shield 200 and the boiler body 25. After cooling the shield 200 and the boiler body 25, the air is supplied to the boiler 25 for combustion.

According to this embodiment, the cooling air supplied to the boiler is reduced, so that the heat recovered into the steam system at the air cooler can be reduced, thus maintaining high heat efficiency. Also, a portion of the air bypasses the boiler body and flows to the gas turbine, so that operability during partial loading is improved. The combustion gas is diluted by the air at the inlet of the gas turbine and thus the duct concentration is reduced, so that reliability of the turbine is improved.

Thus, the present invention provides a pressurized fluidized-bed boiler power plant comprising a single-shaft gas turbine, in which the temperature of the air supplied to the pressurized fluidized-bed boiler can be maintained within a range allowable for the boiler, and thus the temperature of the pressure vessel of the boiler can be maintained within an allowable range, independent of the operating conditions of the boiler.

What is claimed is:

1. In a pressurized fluidized-bed boiler power plant comprising:
   a pressurized fluidized-bed boiler containing a boiler and body in a pressure vessel;
   a gas turbine system including a gas turbine, an air compressor and a gas turbine electric generator which are joined together by one shaft;
   an air supplying pipe for supplying to said pressure vessel pressurized air produced in said air compressor;
   a combustion gas supplying pipe for conducting to said gas turbine combustion gases produced in said boiler body; and
   a steam turbine generator driven by steam produced in said boiler body; said pressurized air supplied to said pressure vessel serving to pressurize the interior of said pressure vessel and pressurized air being introduced into said boiler body for combustion; wherein the improvement comprises an air cooler provided midway said air supplying pipe.

2. A pressurized fluidized-bed boiler power plant according to claim 1, wherein the air temperature at an outlet of said air cooler is controlled by the flow of a coolant of said air cooler.

3. A pressurized fluidized-bed boiler power plant according to claim 1, further comprising means for supplying water for said pressurized fluidized-bed boiler to said air cooler as a coolant.

4. A pressurized fluidized-bed boiler power plant according to claim 1, wherein the coolant of said air cooler is a mixed medium containing water and coal supplied for said pressurized fluidized-bed boiler.

5. A pressurized fluidized-bed boiler power plant comprising:
   a pressurized fluidized-bed boiler containing a boiler body in a pressure vessel;
   a gas turbine system including a gas turbine, an air compressor and a gas turbine electric generator which are joined together by one shaft;
   a steam turbine generator driven by steam produced in said boiler body;
   means for conveying compressed air from said air compressor to said pressure vessel, said pressurized air supplied to said pressure vessel serving to pressurize the interior of said pressure vessel, and pressurized air being introduced into said boiler body for combustion, and an air cooler provided midway said means for conveying compressed air, and a combustion gas supplying pipe for conducting to said gas turbine combustion gases produced in said boiler body.

6. A pressurized fluidized-bed boiler power plant according to claim 5, wherein the air temperature at the outlet of said air cooler is controlled by the flow of a coolant of said air cooler.

7. A pressurized fluidized-bed boiler power plant according to claim 5, further comprising means for supplying water for said pressurized fluidized-bed boiler to said air cooler as a coolant.

8. A pressurized fluidized-bed boiler power plant according to claim 5, wherein the coolant of said air cooler is a mixed medium containing water and coal supplied for said pressurized fluidized-bed boiler.

* * * * *